US006720763B1

United States Patent
Nehl et al.

(10) Patent No.: US 6,720,763 B1
(45) Date of Patent: Apr. 13, 2004

(54) COMPACT ROTARY MAGNETIC POSITION SENSOR HAVING A SINUSOIDALLY VARYING OUTPUT

(75) Inventors: Thomas Wolfgang Nehl, Shelby Township, MI (US); Thaddeus Schroeder, Rochester Hills, MI (US); Nady Boules, Troy, MI (US); Rassem Ragheb Henry, Clinton Township, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/655,035

(22) Filed: Sep. 5, 2000

Related U.S. Application Data
(60) Provisional application No. 60/153,137, filed on Sep. 9, 1999.

(51) Int. Cl.[7] .................................................. G01B 7/30
(52) U.S. Cl. ............................. 324/207.25; 324/207.22
(58) Field of Search ....................... 324/207.25, 207.2, 324/207.21, 235, 251, 252, 174, 207.22; 338/32 R, 324

(56) References Cited

U.S. PATENT DOCUMENTS

| | | | | |
|---|---|---|---|---|
| 2,536,805 A | * | 1/1951 | Hansen, Jr. ................. | 324/251 |
| 3,162,804 A | * | 12/1964 | Parsons .................... | 324/207.2 |
| 3,194,990 A | * | 7/1965 | Kendall .................... | 324/207.2 |
| 4,789,826 A | | 12/1988 | Willett ........................ | 324/208 |
| 5,072,181 A | * | 12/1991 | Burger .................... | 324/207.25 |
| 5,130,650 A | * | 7/1992 | Lemarquand .......... | 324/207.23 |
| 5,251,135 A | | 10/1993 | Serizawa et al. ...... | 364/424.05 |
| 5,754,042 A | | 5/1998 | Schroeder et al. ..... | 324/207.25 |
| 5,789,917 A | | 8/1998 | Oudet et al. ............. | 324/207.2 |
| 6,374,664 B1 | | 4/2002 | Bauer et al. | |
| 6,486,764 B2 | | 11/2002 | Byram | |

* cited by examiner

*Primary Examiner*—Walter E. Snow
(74) *Attorney, Agent, or Firm*—Jimmy L. Funke

(57) ABSTRACT

A rotary position sensor featuring a magnetized rotor which produces a magnetic flux density that varies sinusoidally with respect to the angular position of the rotor, which may be either a selectively magnetized ring or disk. The magnetic flux density produced by the rotor is measured by a sensor that responds in a linear fashion to the magnitude of the radial component of the magnetic flux density. Typical embodiments would use magnetic flux density sensors, as for example either linear Hall sensors or magnetoresistive type sensors. The measured magnetic flux densities are then used as in a traditional resolver to compute position or used to directly generate control signals to operate, for example, a motor.

17 Claims, 2 Drawing Sheets

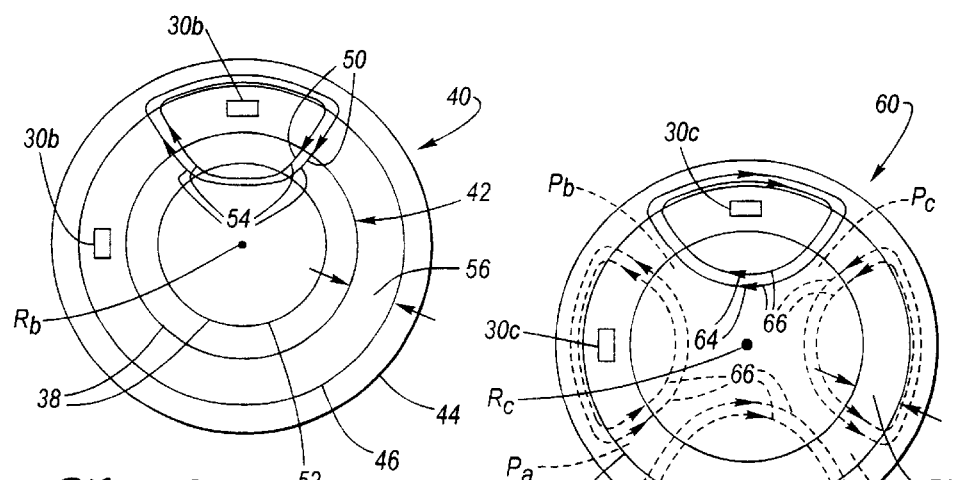
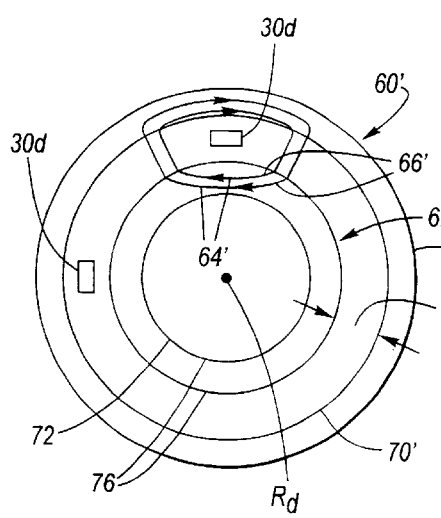
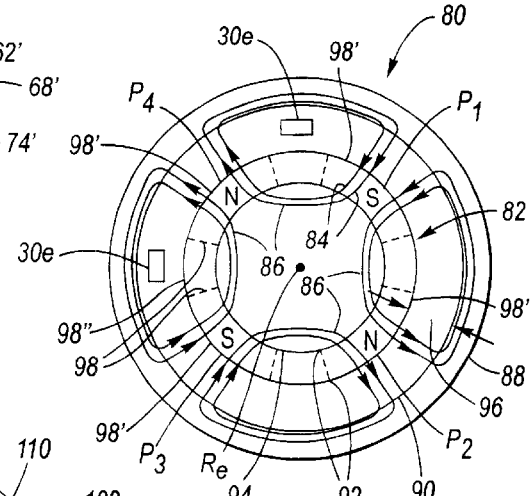
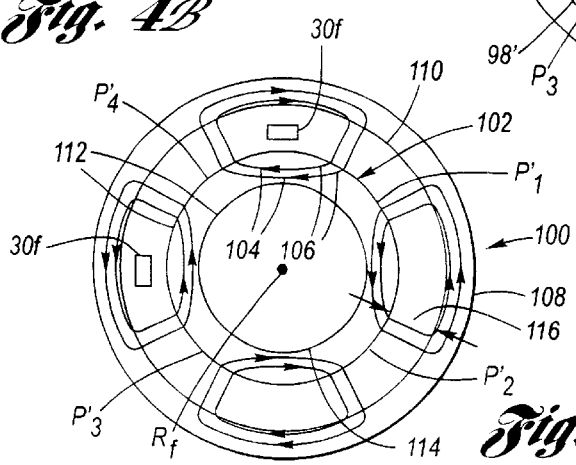
Fig. 3
Fig. 4A
Fig. 4B
Fig. 5A
Fig. 5B

COMPACT ROTARY MAGNETIC POSITION SENSOR HAVING A SINUSOIDALLY VARYING OUTPUT

CROSS-REFERENCE TO RELATED APPLICATIONS

The present application is a continuation-in-part application of provisional application serial No. 60/153,137, filed on Sep. 9, 1999, which application is currently pending.

TECHNICAL FIELD

The present invention relates to rotary magnetic position sensors used to measure angular displacements.

BACKGROUND OF THE INVENTION

The use of magnetoresistors (MRs) and Hall devices, as position sensors is well known in the art. For example, a magnetically biased differential MR sensor may be used to sense angular position of a rotating toothed wheel, as for example exemplified by U.S. Pat. No. 5,754,042.

Position sensors with digital outputs provide discrete position information only, whereas an analog position sensor can provide both position information and outputs that can be used to drive an electric motor or other similar electromechanical devices. Many of these devices are driven by sinusoidal excitations as a function of position. Consequently, an analog position sensor having an output that varies sinusoidally with position could be used to generate absolute angular positions as, for example, for an electrical power steering system to measure the angle of rotation of the steering wheel, and/or reference signals to produce the desired sinusoidal phase drive currents and voltages to drive electric motors and other similar electromechanical devices.

Accordingly, what remains needed is a compact inexpensive contactless position sensor having a sinusoidally varying output suitable for specialized sensing schemes.

SUMMARY OF THE INVENTION

The present invention is a rotary position sensor featuring a magnetized rotor which produces a magnetic flux density that varies sinusoidally with respect to the angular position of the rotor. The magnetic flux density produced by the rotor is measured by a sensor that responds in a linear fashion to the magnitude of the radial component of the magnetic flux density. Typical embodiments would use magnetic flux density sensors, as for example either linear Hall sensors or magnetoresistive type sensors. The measured magnetic flux densities are then used as in a traditional resolver to compute position or used to directly generate control signals to operate, for example, a motor.

Magnetized permanent magnet disks or rings can be used as the rotor to generate signals that vary sinusoidally with respect to position for position determination or for phase current or voltage control for electrical machines, such as motors. Normal position information can be obtained by using two linear magnetic flux density sensors in electrical quadrature. Control of three phase currents or voltages requires a minimum of two sensors spaced 120 electrical degrees apart. The third phase signal being derived from the other two. The use of three sensors spaced 120 electrical degrees apart, in this case, provides a measure of redundancy. Multiple equally spaced sensors could also be used as multiple phase commutation sensors for electric drives requiring multiple phases. Additional sensors may also be included for diagnostic or compensation purposes depending on the application.

According to a first aspect of the present invention, a rotor made of a homogeneous cylindrical permanent magnetic disk or ring is uniformly magnetized in a parallel fashion (i.e. perpendicular to the axis of the cylindrical disk or ring), and produces a sinusoidal radial magnetic flux density in an external constant length nonmagnetic material, such as an air gap. Properly positioned stationary magnetic flux density sensors detect a sinusoidally varying magnetic flux density as the rotor rotates and output a sinusoidally varying signal in response to the sinusoidally varying magnetic flux density.

According to a second aspect of the present invention, a rotor including a continuous cylindrical permanent magnetic ring, or a ring made of discrete magnetic arcuates, is sinusoidally magnetized in a radial fashion (i.e. in a radial direction of a circle perpendicular to the axis of the cylindrical ring or arcuates), and produces a sinusoidal radial magnetic flux density in an external constant length nonmagnetic material, such as an air gap. Properly positioned stationary magnetic flux density sensors detect a sinusoidally varying magnetic flux density as the rotor rotates and output a sinusoidally varying signal in response to the sinusoidally varying magnetic flux density.

According to a third aspect of the present invention, a rotor made of a cylindrical permanent magnetic disk, a continuous magnetic ring or a ring made of discrete magnetic arcuates is sinusoidally magnetized in a tangential fashion (i.e. tangential to a circle perpendicular to the axis of the cylindrical disk or ring), and produces a sinusoidal radial magnetic flux density in an external constant length nonmagnetic material, such as an air gap. Properly positioned stationary magnetic flux density sensors detect a sinusoidally varying magnetic flux density as the rotor rotates and output a sinusoidally varying signal in response to the sinusoidally varying magnetic flux density.

Accordingly, it is an object of the present invention to provide a rotary position sensor according to the first, second, and third aspects of the present invention which is capable of producing and detecting a sinusoidally varying magnetic flux density used to determine angular position of the rotor and/or to provide sinusoidal signals to drive multiple phase electric machines, wherein the rotary position sensor according to the second and third aspects of the present invention are capable of providing sinusoidal signals to drive multiple phase electric machines which require more than two magnetic poles for their operation.

This and additional objects, features and advantages of the present invention will become clearer from the following specification of a preferred embodiment.

BRIEF DESCRIPTION OF THE DRAWINGS

FIG. 3 is an example of a rotary position sensor according to a second aspect of the present invention.

FIG. 4A is a first example of a rotary position sensor according to a third aspect of the present invention.

FIG. 4B is a second example of a rotary position sensor according to the third aspect of the present invention.

FIG. 5A is an example of a multipole rotary position sensor according to the second aspect of the present invention.

FIG. 5B is an example of a multipole rotary position sensor according to the third aspect of the present invention.

DESCRIPTION OF THE PREFERRED EMBODIMENT

Figure 1A:
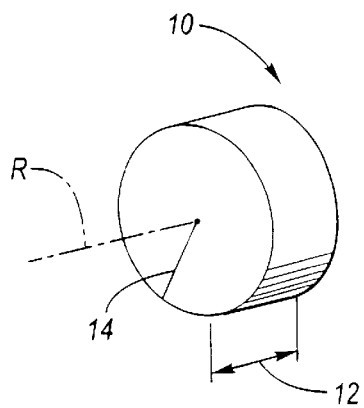
FIG. 1A is a schematic representation of magnetic disk according to a first aspect of the present invention.

FIG. 1A is a schematic representation of a magnetic disk 10 used in accordance with a first aspect of the present invention. The length 12 and radius 14 are, typically, approximately 10 mm. However, the exact dimensions of the length 12 and radius 14 depend upon the particular application. The disk is rotatable about a rotation axis R.

Figure 1B:
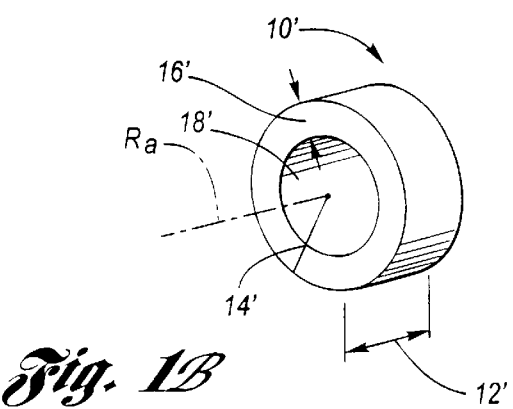
FIG. 1B is a schematic representation of magnetic ring according to the first aspect of the present invention.

FIG. 1B is a schematic representation of magnetic ring 10' used in accordance with a first aspect of the present invention. The length 12' and radius 14' are, typically, approximately 10 mm. The thickness of the ring 16' is, typically, 3 to 10 mm depending upon the number of magnetic poles and the particular application. The exact dimensions of the length 12' and radius 14' depend upon the particular application, as well. The ring 10' is rotatable about a rotation axis $R_a$.

Figure 2A:
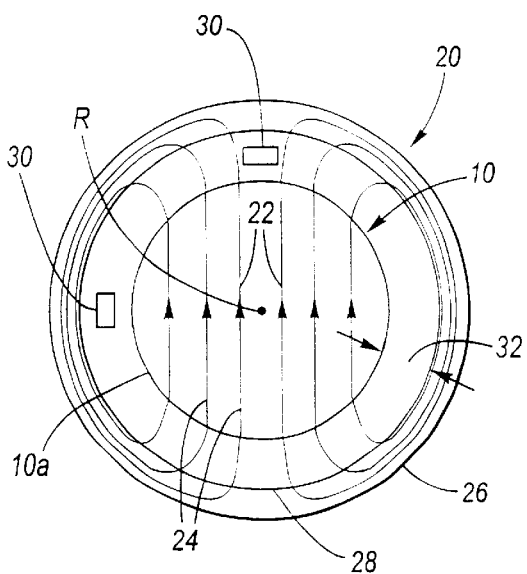
FIG. 2A is a first example of a rotary position sensor according to the first aspect of the present invention.

FIG. 2A is a first example of a rotary position sensor 20 according to the first aspect of the present invention. The rotary position sensor 20 consists of a magnetic disk 10 rotatable about the rotation axis R, the disk forming a rotor 10a that is homogeneously magnetized in a parallel fashion 22 as shown by the magnetic flux density 24 in FIG. 2A, a stationary core 26 made of a ferromagnetic (also referred to as "soft" magnetic) material, and a stationary annulus 28 made of a nonmagnetic material with two or more magnetic flux density sensors 30 (ie., Hall sensors or magnetoresistors) which are appropriately positioned, not necessarily in quadrature, within the annulus to detect the magnetic flux density 24 to meet specific sensing requirements. As is well known in the art, the homogeneous cylindrical permanent magnet 10 will produce a sinusoidal radial flux density 24 in a constant length nonmagnetic gap 32 when uniformly magnetized in a parallel fashion 22 as shown in FIG. 2A. As the rotor 10a rotates, the magnetic flux density sensors 30 detect a sinusoidal magnetic flux density 24 and output a corresponding sinusoidal signal. The signal outputs of the magnetic flux density sensors 30 may be used to detect the absolute angular position of the rotor 10a or to provide sinusoidal signals to drive multiple phase electric machines.

Figure 2B:
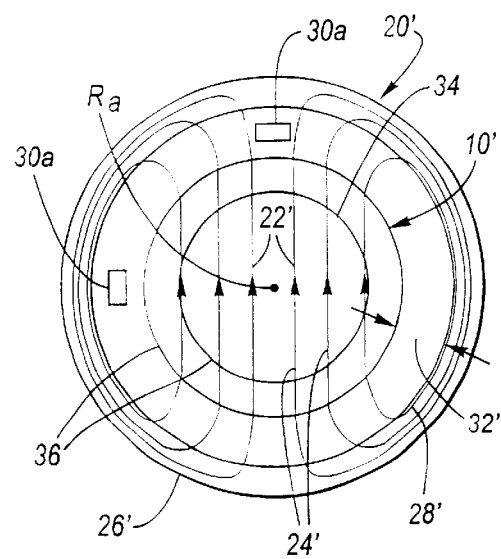
FIG. 2B is a second example of a rotary position sensor according to the first aspect of the present invention.

FIG. 2B is a second example of a rotary position sensor 20' according to the first aspect of the present invention. The rotary position sensor 20' consists of a magnetic ring 10' which is rotatable about the rotation axis $R_a$, the ring being homogeneously magnetized in a parallel fashion 22' as shown by the magnetic flux density 24' in FIG. 2B. The rotary position sensor 20' further consists of a stationary outer core 26' made of a magnetic material, a stationary annulus 28' made of a nonmagnetic material with two or more magnetic flux density sensors 30a (ie., Hall sensors or magnetoresistors) which are appropriately positioned, not necessarily in quadrature, within the annulus to detect the magnetic flux density 24' to meet specific sensing requirements, and a inner core 34 made of a ferromagnetic material rotating in conjunction with the magnetic ring 10', wherein the magnetic ring and the inner core collectively form a rotor 36. As is well known in the art, the homogeneous cylindrical permanent magnet 10' will produce a sinusoidal radial flux density 24' in a constant length nonmagnetic gap 32' when uniformly magnetized in a parallel fashion 22' as shown in FIG. 2B. As the rotor 36 rotates, the magnetic flux density sensors 30a detect a sinusoidal magnetic flux density 28' and output a corresponding sinusoidal signal. The signal outputs of the magnetic flux density sensors 30a may be used to detect the absolute angular position of the rotor 36 or to provide sinusoidal signals to drive multiple phase electric machines.

FIG. 3 is an example of a rotary position sensor 40 according to a second aspect of the present invention. The rotary position sensor 40 consists of a magnetic ring 42 rotatable about a rotation axis $R_b$, wherein the ring is sinusoidally magnetized in a radial fashion 54 as shown by the magnetic flux density 50 in FIG. 3. The rotary position sensor 40 further consists of a stationary outer core 44 made of a magnetic material, a stationary annulus 46 made of a nonmagnetic material with two or more magnetic flux density sensors 30b (ie., Hall sensors or magnetoresistors) which are appropriately positioned, not necessarily in quadrature, within the annulus to detect the magnetic flux density 50 to meet specific sensing requirements, and an inner core 52 made of a magnetic material rotating in conjunction with the magnetic ring 42, wherein the magnetic ring and the inner core collectively form a rotor 38. The sinusoidal magnetized cylindrical permanent magnet 42 will produce a sinusoidal radial flux density 50 in a constant length nonmagnetic gap 56 when sinusoidally magnetized in a radial fashion 54 as shown in FIG. 3. As the rotor 38 rotates, the magnetic flux density sensors 30b detect a sinusoidal magnetic flux density 50 and output a corresponding sinusoidal signal. The signal outputs of the magnetic flux density sensors 30b may be used to detect the absolute angular position of the rotor 38 or to provide sinusoidal signals to drive multiple phase electric machines.

FIG. 4A is a first example of a rotary position sensor 60 according to a third aspect of the present invention. The rotary position sensor 60 consists of a rotor 62a rotatable about a rotation axis $R_c$, consisting of a cylindrically-shaped magnetic disk 62 which is sinusoidally magnetized in a tangential fashion 64 as shown by the magnetic flux density 66 in FIG. 4A.

The rotary position sensor 60 further consists of an outer core 68 made of a ferromagnetic material, and a stationary annulus 70 made of a nonmagnetic material with two or more magnetic flux density sensors 30c (ie., Hall sensors or magnetoresistors) which are appropriately positioned, not necessarily in quadrature, within the annulus to detect the magnetic flux density 66 to meet specific sensing requirements. The sinusoidally magnetized disk permanent magnet 62 will produce a sinusoidally radial flux density 66 in a constant length nonmagnetic gap 74 when sinusoidally magnetized in a tangential fashion 64 as shown in FIG. 4A. As the rotor 62a rotates, the magnetic flux density sensors 30c detect a sinusoidal magnetic flux density 66 and output a corresponding sinusoidal signal. The signal outputs of the magnetic flux density sensors 30c may be used to detect the absolute angular position of the rotor 62a or to provide sinusoidal signals to drive multiple phase electric machines. The cylindrically-shaped magnetized disk 62 may be a multipole magnetized, as shown by the dashed magnetic flux density 66' to provide magnetic poles $P_a$, $P_b$, $P_c$, $P_d$.

FIG. 4B is a second example of a rotary position sensor 60' according to the third aspect of the present invention. The rotary position sensor 60' consists of a magnetic ring 62' rotatable about a rotation axis $R_d$, which is sinusoidally magnetized in a tangential fashion 64' as shown by the magnetic flux density 66' in FIG. 4B. The rotary position sensor further consists of a stationary outer core 68' made of a ferromagnetic material, a stationary annulus 70' made of a nonmagnetic material with two or more magnetic flux density sensors 30*d* (ie., Hall sensors or magnetoresistors) which are appropriately positioned, not necessarily in quadrature, within the annulus to detect the magnetic flux density 66' to meet specific sensing requirements, and an inner core 72, made of either a ferromagnetic material or nonmagnetic material depending upon the application, rotating in conjunction with the magnetic ring 62', wherein the magnetic ring and the inner core collectively form a rotor 76. The sinusoidally magnetized permanent magnet ring 62' will produce a sinusoidal radial flux density 66' in a constant length nonmagnetic gap 74' when sinusoidally magnetized in a tangential fashion 64' as shown in FIG. 4B. As the rotor 76 rotates, the magnetic flux density sensors 30*d*' detect a sinusoidal magnetic flux density 66' and output a corresponding sinusoidal signal. The signal outputs of the magnetic flux density sensors 30*d* may be used to detect the absolute angular position of the rotor 76 or to provide sinusoidal signals to drive multiple phase electric machines.

FIG. 5A is an example of a multipole rotary position sensor 80 according to the second aspect of the present invention. The multipole rotary position sensor 80 consists of a magnetic ring 82 rotatable about a rotation axis $R_e$, wherein the ring is sinusoidally magnetized in a radial fashion 84 as shown by the magnetic flux density 86 such as to produce a magnetic ring having multiple magnetic poles $P_1$, $P_2$, $P_3$, $P_4$, as shown in FIG. 5A. The multipole rotary position sensor 80 further consists of a stationary outer core 88 made of a ferromagnetic material, a stationary annulus 90 made of a nonmagnetic material with two or more magnetic flux density sensors 30*e* (ie., Hall sensors or magnetoresistors) which are appropriately positioned, not necessarily in quadrature, within the annulus to detect the magnetic flux density 86 to meet specific sensing requirements, and an inner core 94 made of a ferromagnetic material rotating in conjunction with the magnetic ring 82, wherein the magnetic ring and the inner core collectively form a rotor 92. The multiple sinusoidally magnetized permanent magnet ring 82 will produce multiple sinusoidally radial flux densities 86 in a constant length nonmagnetic gap 96 when sinusoidally magnetized in a radial fashion 84 as shown in FIG. 5A. As the rotor 92 rotates, the magnetic flux density sensors 30*e* detect a sinusoidal magnetic flux density 86 and output a corresponding sinusoidal signal. The signal outputs of the magnetic flux density sensors 30*e* may be used to detect the absolute angular position of the rotor 92 or to provide sinusoidal signals to drive multiple phase electric machines, especially electric machines with more than two phases.

While the magnetic ring 82 may be in the form of a continuous multi-pole magnetized magnetic material, as shown by dashed lines 98, the ring may be composed of discrete magnetic arcuates 98' mutually connected by magnetic or nonmagnetic material 98" to collectively form the ring.

FIG. 5B is an example of a multipole rotary position sensor 100 according to a third aspect of the present invention. The multipole rotary position sensor 100 consists of a magnetic ring 102 rotatable about a rotation axis $R_f$, wherein the ring is sinusoidally magnetized in a tangential fashion 104 as shown by the magnetic flux density 106 such as to produce a magnetic ring having multiple magnetic poles $P_1'$, $P_2'$, $P_3'$, $P_4'$, as shown in FIG. 5B. The multipole rotary position sensor 100 further consists of a stationary outer core 108 made of a ferromagnetic material, a stationary annulus 110 made of a nonmagnetic material with two or more magnetic flux density sensors 30*f* (ie., Hall sensors or magnetoresistors) which are appropriately positioned, not necessarily in quadrature, within the annulus to detect the magnetic flux density 106 to meet specific sensing requirements, and an inner core 114 made of either a ferromagnetic material or nonmagnetic material depending upon the application rotating in conjunction with the magnetic ring 102, wherein the magnetic ring and the inner core collectively form a rotor 112. The multiple sinusoidally magnetized cylindrical permanent magnet 102 will produce multiple sinusoidally radial flux densities 106 in a constant length nonmagnetic gap 116 when sinusoidally magnetized in a radial fashion 104 as shown in FIG. 5B. As the rotor 112 rotates, the magnetic flux density sensors 30*f* detect a sinusoidal magnetic flux density 106 and output a corresponding sinusoidal signal. The signal outputs of the magnetic flux density sensors 30*f* may be used to detect the absolute angular position of the rotor 112 or to provide sinusoidal signals to drive multiple phase electric machines, especially electric machines with two or more pole pairs. Machines with one pole pair would use the sensor configurations of FIGS. 2A and 2B.

It is to be noted that while FIGS. 5A and 5B depict multipoles in the form of two pairs of magnetic poles, any number of pairs of magnetic poles may be provided. Further, the magnetic ring of FIG. 5B may be continuous or may be composed of discrete arcuate magnets as shown at FIG. 5A; indeed, any of the magnetic disks or rings may be discretely constructed.

Several comments concerning the rotary position sensor according to the present invention will be addressed hereinbelow.

The rotary position sensor according to the present invention is a low cost, analog position sensor comprising, in one form, a rotating, parallel magnetized disk-type magnet, a nonmagnetic annulus containing two or more linear magnetic flux density sensors (magnetoresistor or Hall sensor), and a ferromagnetic (also referred to as a "soft" magnetic) stationary core. The nonmagnetic annulus provides support for the magnetic flux density sensors and serves as a bearing surface for the rotating magnet, it also maintains the concentricity between the various elements of the sensor. However, embodiments without this annulus are also possible. The two-pole structure of the magnet allows for the maximum thickness of the annulus (or air gap) for a given magnet diameter, thus minimizing eccentricity effects.

A modified embodiment of the rotary position sensor according to the present invention is applicable to brushless motor applications, where the sensor permits direct control of the commutation by employing one sensor for each of the m-phases. In this case, the number of poles in the machine must match the number of poles of the sensor magnet. For applications with four or more poles, the magnetization must be modified from the parallel to either sinusoidal tangential or radial. In the radially magnetized case, either ring magnets or arcuates combined with a ferromagnetic core are required. The tangentially magnetized magnets do not need this core as the flux is contained almost entirely in the magnet.

Another modified embodiment of the rotary position sensor according to the present invention uses a ring magnet and ferromagnetic (soft magnetic) core in place of the magnet disk. In this embodiment, the ring magnet can be mounted directly over the shaft of a motor or any other device requiring similar rotary position monitoring.

Another embodiment of the rotary position sensor according to the present invention employs the sum of the outputs of a set of phase commutation sensors as a means for calibration and diagnostics. This is achieved by summing all output and checking for any deviation from a zero sum (ideal case).

Yet another embodiment of the rotary position sensor according to the present invention is where an m-phase brushless motor is operated using any set of (m−1) flux sensors. The output of the faulted flux density sensor is equal to the negative sum of the outputs of the remaining (m−1) flux density sensors. A fault tolerant sensor can therefore be constructed which can operate with the loss of any one of the (m) flux sensors.

It should be noted that while two magnetic flux density sensors are depicted in each shown embodiment, this is merely by way of example; one, two, or more magnetic flux density sensors may be used with any embodiment.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A rotary position sensor comprising:
   a magnetized disk rotatable about a rotation axis;
   an outer core of a ferromagnetic material nonrotatable about the rotation axis, said outer core being concentrically disposed relative to said axis of rotation;
   an air gap located between said outer core and said magnetized disk;
   at least one magnetic flux density sensor selectively located at said air gap in stationary position with respect to said outer core;
   wherein the magnetization of said disk provides a magnetic field oriented in a plane perpendicular to said rotation axis; and
   wherein said disk is tangentially magnetized with at least one pair of poles.

2. The rotary position sensor of claim 1, further comprising an annulus located between said outer core and said disk, said annulus being composed of a nonmagnetic material, said at least one sensor being embedded in said annulus.

3. The rotary position sensor of claim 1, wherein said disk is tangentially magnetized with a plurality of pairs of poles.

4. The rotary position sensor of claim 3, further comprising an annulus located between said outer core and said disk, said annulus being composed of a nonmagnetic material, said at least one sensor being embedded in said annulus.

5. A rotary position sensor comprising:
   a magnetized ring rotatable about a rotation axis;
   an outer core of a ferromagnetic material nonrotatable about the rotation axis, said outer core being concentrically disposed relative to said axis of rotation;
   an annular air gap located concentrically between said outer core and said magnetized ring; and
   at least one magnetic flux density sensor selectively located at said air gap in stationary position with respect to said outer core;
   wherein the magnetization of said ring provides a magnetic field oriented in a plane perpendicular to said rotation axis;
   wherein said ring is tangentially magnetized with at least one pair of poles.

6. The rotary position sensor of claim 5, further comprising an annulus located between said outer core and said ring, said annulus being composed of a nonmagnetic material, said at least one sensor being embedded in said annulus.

7. The rotary position sensor of claim 6, further comprising an inner core of ferromagnetic material disposed between said axis of rotation and said ring.

8. The rotary position sensor of claim 5, wherein said ring is tangentially magnetized with a plurality of pairs of poles.

9. The rotary position sensor of claim 8, further comprising an annulus located between said outer core and said ring, said annulus being composed of a nonmagnetic material, said at least one sensor being embedded in said annulus.

10. The rotary position sensor of claim 9, further comprising an inner core of ferromagnetic material disposed between said axis of rotation and said ring.

11. The rotary position sensor of claim 8, wherein said plurality of pairs of poles comprise a plurality of pairs of mutually spaced apart magnetic arcuates.

12. A rotary position sensor comprising:
   a magnetized ring rotatable about a rotation axis;
   an outer core of a ferromagnetic material nonrotatable about the rotation axis, said outer core being concentrically disposed relative to said axis of rotation;
   an annular air gap located concentrically between said outer core and said magnetized ring;
   an annulus located between said outer core and said ring; and
   at least one magnetic flux density sensor selectively located at said air gap in stationary position with respect to said outer core;
   wherein the magnetization of said ring provides a magnetic field oriented in a plane perpendicular to said rotation axis;
   wherein said ring is radially magnetized with at least one pair of poles; and wherein said annulus is composed of a nonmagnetic material, said at least one magnetic flux density sensor being embedded in said annulus;
   wherein said rotary position sensor further comprises an inner core of ferromagnetic material disposed between said axis of rotation and said ring.

13. The rotary position sensor of claim 12, wherein said ring is radially magnetized with a plurality of pairs of poles.

14. The rotary position sensor of claim 13, wherein said plurality of pairs of poles comprise a plurality of pairs of mutually spaced apart magnetic arcuates.

15. A rotary position sensor comprising:
   a magnetized disk rotatable about a rotation axis;
   an outer core of a ferromagnetic material nonrotatable about the rotation axis, said outer core being concentrically disposed relative to said axis of rotation;
   an air gap located between said outer core and said magnetized disk;
   at least one magnetic flux density sensor selectively located at said air gap in stationary position with respect to said outer core; and
   an annulus located between said outer core and said disk, said annulus being composed of a nonmagnetic material, said at least one sensor being embedded in said annulus;

wherein the magnetization of said disk is homogeneously magnetized and provides a magnetic field oriented in a plane perpendicular to said rotation axis.

16. A rotary position sensor comprising:

a magnetized ring rotatable about a rotation axis;

an outer core of a ferromagnetic material, said outer core being concentrically disposed relative to said axis of rotation;

an air gap located between said outer core and said magnetized ring; and at least one magnetic flux density sensor selectively located at said air gap;

wherein the magnetization of said ring provides a magnetic field oriented in a plane perpendicular to said rotation axis; and wherein said ring is homogeneously magnetized; and wherein said rotary position sensor further comprises an inner core of ferromagnetic material disposed between said axis of rotation and said ring.

17. The rotary position sensor of claim 16, further comprising an annulus located between said outer core and said ring, said annulus being composed of a nonmagnetic material, said at least one sensor being embedded in said annulus.

* * * * *